US010511663B2

(12) United States Patent
Masuda et al.

(10) Patent No.: US 10,511,663 B2
(45) Date of Patent: Dec. 17, 2019

(54) INFORMATION PROCESSING APPARATUS, INFORMATION PROCESSING METHOD, AND PROGRAM

(71) Applicant: Sony Corporation, Minato-ku (JP)

(72) Inventors: Hiroki Masuda, Tokyo (JP); Hideki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 272 days.

(21) Appl. No.: 14/518,465

(22) Filed: Oct. 20, 2014

(65) Prior Publication Data
US 2015/0163305 A1 Jun. 11, 2015

(30) Foreign Application Priority Data

Nov. 27, 2013 (JP) ................. 2013-244789

(51) Int. Cl.
*G06F 15/16* (2006.01)
*H04L 29/08* (2006.01)
*G06F 16/958* (2019.01)
*H04L 12/64* (2006.01)

(52) U.S. Cl.
CPC ........ *H04L 67/1097* (2013.01); *G06F 16/972* (2019.01); *H04L 12/6418* (2013.01); *H04L 67/1076* (2013.01); *H04L 67/2828* (2013.01)

(58) Field of Classification Search
CPC ........... G06F 17/3089; G06F 17/30905; G06F 17/30265; G06F 17/30011; G11B 27/105; G06Q 30/0601; H04N 1/00156; H04N 7/17318; H04N 1/32101; H04N 5/232; G06T 11/60; H04L 67/06; H04L 63/102

USPC ............ 709/203, 212; 358/400, 403; 348/1, 348/211; 707/802, 999.002
See application file for complete search history.

(56) References Cited

U.S. PATENT DOCUMENTS

| | | | | |
|---|---|---|---|---|
| 6,182,127 B1 * | 1/2001 | Cronin, III | ........ | G06F 17/30905 707/999.002 |
| 6,282,330 B1 * | 8/2001 | Yokota | .................... | G06T 11/60 358/452 |
| 6,304,277 B1 * | 10/2001 | Hoekstra | ................. | G06T 11/60 345/600 |
| 6,762,860 B1 * | 7/2004 | Watanabe | ......... | G06F 17/30265 358/403 |

(Continued)

FOREIGN PATENT DOCUMENTS

JP 2004-265273 9/2004

*Primary Examiner* — Dustin Nguyen
(74) *Attorney, Agent, or Firm* — Xsensus LLP

(57) ABSTRACT

An information processing apparatus includes a communication unit, a storage unit, and a control unit. The communication unit is configured to communicate with a plurality of devices. The control unit is configured to control the communication unit to receive a low-quality version of a content from the device, store the received low-quality version in the storage unit with the low-quality version of the content associated with an identifier which is identical with an identifier of the content, thereby registering the content, generate, in response to a request from the device, a content list including a thumbnail generated from the low-quality version, transmit the content list to the device, and when the content instructed to be reproduced by the device is not stored in any device on the basis of the content list, control the communication unit to transmit the low-quality version to the device.

8 Claims, 11 Drawing Sheets

(56) References Cited

U.S. PATENT DOCUMENTS

| | | | | |
|---|---|---|---|---|
| 7,035,907 | B1* | 4/2006 | Decasper | H04L 67/06 |
| | | | | 709/212 |
| 7,457,820 | B1* | 11/2008 | Viger | G06F 17/30011 |
| 7,793,326 | B2* | 9/2010 | McCoskey | H04N 7/17318 |
| | | | | 725/53 |
| 8,346,956 | B2* | 1/2013 | Day | H04L 63/102 |
| | | | | 370/235 |
| 8,947,547 | B1* | 2/2015 | Millikan | H04N 1/00156 |
| | | | | 348/211.1 |
| 2001/0026376 | A1* | 10/2001 | I'Anson | G06Q 30/0601 |
| | | | | 358/400 |
| 2002/0198936 | A1* | 12/2002 | McIntyre | G11B 27/105 |
| | | | | 709/203 |
| 2003/0231240 | A1* | 12/2003 | Wilkins | H04N 1/32101 |
| | | | | 348/207.99 |
| 2004/0070786 | A1* | 4/2004 | Molteno | H04N 7/17318 |
| | | | | 358/1.15 |
| 2006/0271593 | A1* | 11/2006 | De Mes | G06F 17/30265 |
| 2010/0205221 | A1* | 8/2010 | Shaw | G06F 17/3089 |
| | | | | 707/802 |
| 2012/0188344 | A1* | 7/2012 | Imai | H04N 5/232 |
| | | | | 348/47 |

* cited by examiner

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2013-244789 filed Nov. 27, 2013, the entire contents of which are incorporated herein by reference.

BACKGROUND

The present technology relates to an information processing apparatus capable of communicating with another information processing apparatus and to an information processing method and a program in the information processing apparatus.

From the past, a system for sharing a content among a plurality of apparatuses is provided. For example, Japanese Patent Application Laid-open No. 2004-265273 discloses an information supply system in which an index server and a plurality of nodes are connected to each other via a network, and in the index server, attribute data of a content provided by the nodes is defined and stored.

In the system, the nodes each search for attribute data stored in the index server and on the basis of a result of the search, directly accesses a predetermined node having a corresponding content to take a desired content therein.

SUMMARY

However, in the system disclosed in Japanese Patent Application Laid-open No. 2004-265273, as the attribute data, a name (song title, for example) of a content, a file format, a service name, or the like is used to search for a content, and contents corresponding to the attribute are displayed as a list. However, a user has to know the attribute data in advance, and inputting the data is a troublesome task.

Further, in the system disclosed in Japanese Patent Application Laid-open No. 2004-265273, the index server does not store the contents. Therefore, if such a situation that a content is not stored in any node occurs for some reason, it may be impossible to reproduce the content.

In view of the circumstances as described above, it is desirable to provide an information processing apparatus capable of causing users of a plurality of devices connected via a network to easily and quickly search for a content to be reproduced on the devices and meeting requests of the users at the very least who want to reproduce the content, even if there is no content in any device, and an information processing method and a program in the information processing apparatus.

According to an embodiment of the present technology, there is provided an information processing apparatus including a communication unit, a storage unit, and a control unit. The communication unit is configured to communicate with a plurality of devices. The control unit is configured to control the communication unit to receive a low-quality version of a content from the device, and store the received low-quality version in the storage unit with the low-quality version of the content associated with an identifier which is identical with an identifier of the content, thereby registering the content. Further, the control unit is configured to generate, in response to a request from the device, a content list including a thumbnail generated from the low-quality version, transmit the content list to the device, and when the content instructed to be reproduced by the device is not stored in any device on the basis of the content list, control the communication unit to transmit the low-quality version to the device.

With this structure, the information processing apparatus can allow users of the plurality of devices connected via a network to easily and quickly search for a content to be reproduced on the device and satisfy the request of the users who want to reproduce the content at the very least, even if the content does not exist in any device. Here, the low-quality version refers to a version obtained by scaling the original content down, a version of a lower resolution, or the like, but is not limited to those.

The control unit may control the storage unit to store a hash value generated from the content at a time of registration with the hash value associated with the low-quality version, control the communication unit to receive a registration request of a new content from the device along with the hash value of the content, and permit registration of the content when the content having an identical hash value with the received hash value is not stored.

With this structure, the information processing apparatus can determine whether there is an identical content or not by comparing the hash values and prevent the same contents from being stored.

When the content is edited by the device, the control unit may control the communication unit to receive the low-quality version of the edited content and the hash value generated from the edited content, and may control the storage unit to store the edited low-quality version and the hash value received in place of the low-quality version before being edited and the hash value which are stored.

With this structure, the information processing apparatus can reflect the edit on the registered information in the case where the content is edited.

The control unit may control the storage unit to store meta data of the content, control, when one of the devices edits the meta data, the communication unit to receive edited information of the meta data, control the storage unit to update the stored meta data without changing the hash value by the received edited information, and control the communication unit to transmit the edited information to another device that stores the content.

With this structure, the information processing apparatus can reflect the edit of the meta data of the registered content by the edited information and transmit the edited data to another device and reflect the data thereon.

The content may be a still image. In this case, when the still image registered by the device is rotated, the control unit may control the communication unit to receive information relating to an orientation of the rotated still image as the edited information.

With this structure, the information processing apparatus can reflect the change of the display direction of the image on all the devices having the image.

The control unit may control the storage unit to store storage position information of the content at a time of registration of the content, and in response to a request from the device, control the communication unit to transmit the storage position information of each content along with the content list.

With this structure, the information processing apparatus stores the storage position information of the contents, thereby making it possible to cause the devices to obtain the content by using the storage position information and reproduce the content.

According to another embodiment of the present technology, there is provided an information processing method including receiving a low-quality version of a content from one of a plurality of devices, registering the content by storing the received low-quality version with the low-quality version associated with an identifier identical with an identifier of the content, generating, in response to a request from the device, a content list including a thumbnail generated from the low-quality version, transmitting the content list to the device, and transmitting the low-quality version to the device, when the content instructed to be reproduced by the device is not stored in any device on the basis of the content list.

According to another embodiment of the present technology, there is provided a program causing an information processing apparatus to execute a receiving step, a registering step, a generating step, a first transmitting step, and a second transmitting step. In the receiving step, a low-quality version of a content is received from one of a plurality of devices. In the registering step, the content is registered by storing the received low-quality version with the low-quality version associated with an identifier identical with an identifier of the content. In the generating step, in response to a request from the device, a content list including a thumbnail generated from the low-quality version is generated. In the first transmitting step, the content list is transmitted to the device. In the second transmitting step, the low-quality version is transmitted to the device, when the content instructed to be reproduced by the device is not stored in any device on the basis of the content list.

As described above, according to the present technology, it is possible to allow the users of the plurality of devices connected via the network to easily and quickly search for the content to be reproduced on the device and satisfy the request of the users who want to reproduce the content at the very least, even if the content does not exist in any device. This effect does not limit the present technology. Exerting the effect by the present technology is not a requirement of the present technology.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

(Outline of System)

Figure 1:
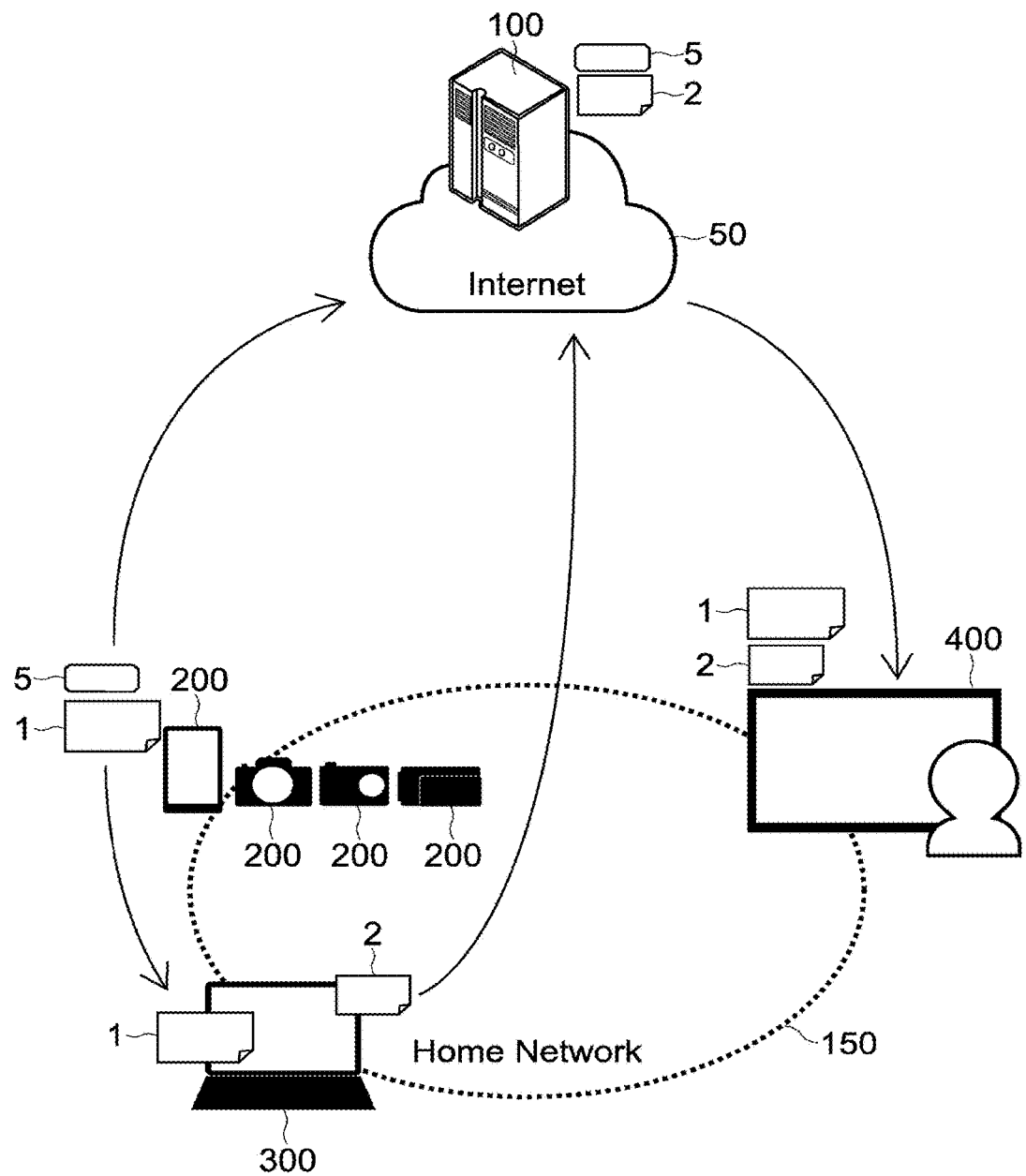
FIG. 1 is a diagram showing the outline of a reproduction system according to an embodiment of the present technology.

FIG. 1 is a diagram showing the outline of a reproduction system according to this embodiment.

As shown in FIG. 1, the reproduction system in this embodiment is constituted of a content registration server 100 on an Internet 50 and a plurality of devices on a home network 150. The devices on the home network 150 includes a content generation apparatus 200, a home server 300, and a content reproduction apparatus 400.

The content generation apparatus 200 is, for example, a smart phone, a digital camera, a camcorder, or the like, and generates a content of a still image, a moving image, or the like, for example.

The home server 300 is, for example, a PC and functions as a local storage that stores a content generated by the content generation apparatus 200.

The content reproduction apparatus 400 is, for example, a TV and receives the content stored in the home server 300 from the home server 300 and reproduces the content.

Those apparatuses on the home network 150 can communicate with each other in conformity with the DLNA (Digital Living Network Alliance). That is, the home server 300 functions as a DMS (Digital Media Server) in the DLNA, and the content reproduction apparatus 400 functions as a DMR (Digital Media Renderer) in the DLNA. Further, the content generation apparatus 200 can function as a DMC (Digital Media Controller) in the DLNA.

The content registration server 100 registers information relating to a content generated by the content generation apparatus 200. Specifically, in the case where the content is generated by the content generation apparatus 200, a hash value 5 is generated from the content (original image 1) as a key for uniquely identifying the content. The hash value is uploaded to the content registration server 100 and stored along with taken date and time, meta data such as storage position information of the content, GPS (position) information, file format information, and the like. In response to registration requests from all the content generation apparatuses 200, the content registration server 100 generates an item ID for identifying the content with the meta data and the hash value associated therewith, and stores those as registration information.

Further, the original image 1 is also stored in the home server 300. In the home server 300, from the original image 1, a proxy image 2 (low-quality version of the content) obtained by resizing the original image 1 (downsizing the image to a predetermined size) is generated. The proxy image 2 is uploaded to the content registration server 100 and stored with the proxy image 2 associated with the hash value and the meta data. In addition, in the content registration server 100, the original image 1 can be stored.

The content reproduction apparatus 400 downloads, from the content registration server 100, a list of contents capable of being reproduced on the home network 150, which is generated from the registration information, selects a content on the basis of the list, and reproduces the content from a storage position thereof (for example, home server 300).

In addition, in the case where the content to be reproduced (original image 1) does not exist on the home network 150, the content reproduction apparatus 400 can alternatively downloads the proxy image 2 from the content registration server 100 and reproduce the image.

(Hardware Structure of Content Registration Server)

Figure 2:
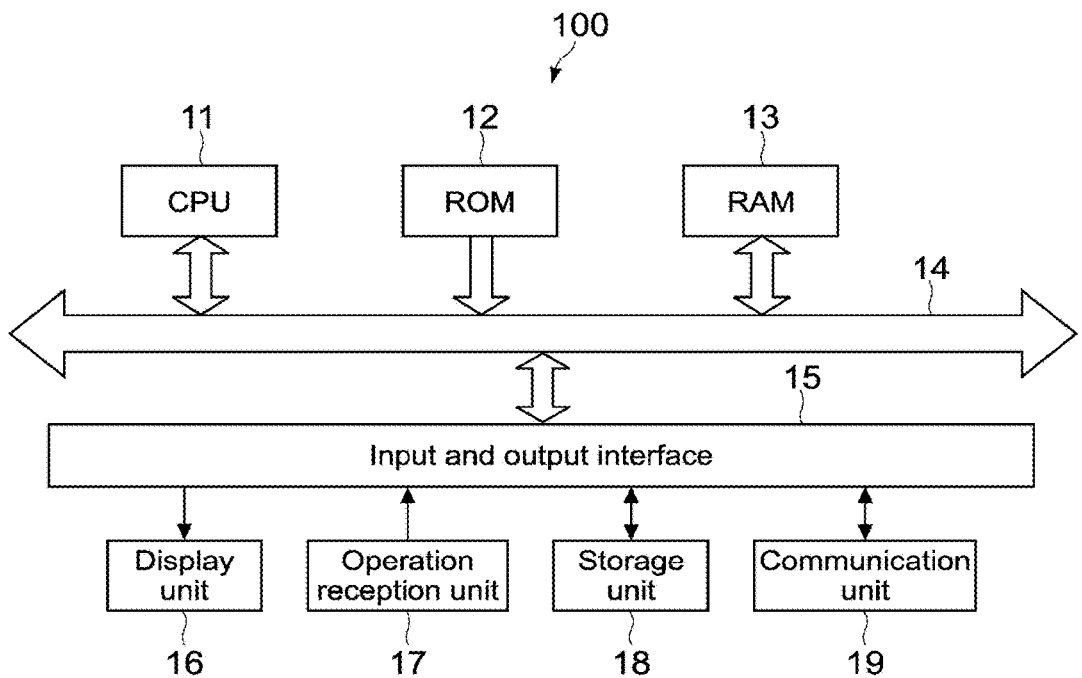
FIG. 2 is a diagram showing the hardware structure of a content registration server in the system.

FIG. 2 is a diagram showing the hardware structure of the content registration server 100. As shown in the figure, the content registration server 100 is provided with a CPU (Central Processing Unit) 11, a ROM (Read Only Memory) 12, a RAM (Random Access Memory) 13, input and output interface 15, and a bus 14 that connects those.

The CPU 11 appropriately accesses the RAM 13 or the like when necessary and performs overall control for entire blocks of the content registration server 100 while performing various computation processes. The ROM 12 is a nonvolatile memory in which an OS executed by the CPU 11 and firmware such as various parameters and a program are stored fixedly. The RAM 13 is used as a work area or the like for the CPU 11 and temporarily holds an OS, various applications in execution, and various pieces of data which are being processed.

To the input and output interface 15, a display unit 16, an operation reception unit 17, a storage unit 18, a communication unit 19, and the like are connected.

The display unit 16 is a display device that uses, for example, an LCD (Liquid Crystal Display), an OELD (Organic Electra-Luminescence Display), a CRT (Cathode Ray Tube), or the like.

The operation reception unit 17 is, for example, a pointing device such as a mouse, a keyboard, a keyboard, a touch panel, or another input apparatus. In the case where the operation reception unit 17 is a touch panel, the touch panel can be integrally formed with the display unit 16.

The storage unit 18 is a nonvolatile memory, for example, an HDD (Hard Disk Drive), a flash memory (SSD: Solid State Drive), or another solid-state memory. In the storage unit 18, the OS, the various applications, the various pieces of data are stored. In particular, in this embodiment, in the storage unit 18, the registration information of the content, data such as the proxy image, and a program such as software executed to perform a content registration process or the like are stored.

The communication unit 19 is an NIC or the like for connection to the Internet 50 and performs a communication process with the apparatuses on the home network 150.

(Hardware Structures of Content Generation Apparatus, Home Server, and Content Reproduction Apparatus)

Figure 3:
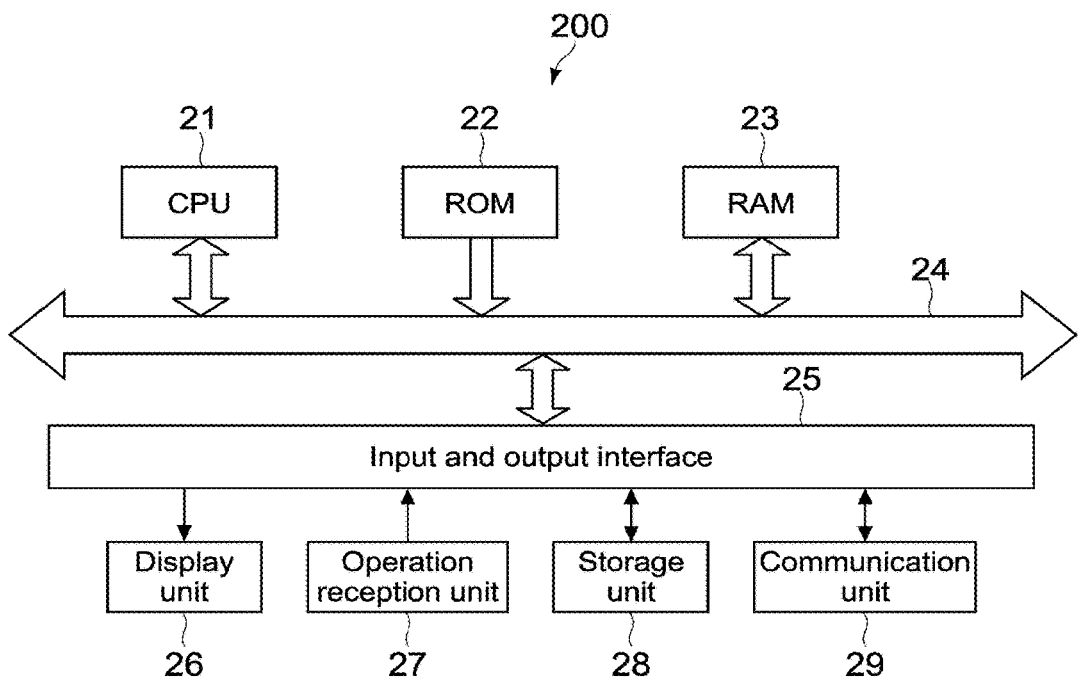
FIG. 3 is a diagram showing the hardware structure of a content generation apparatus in the system.

FIG. 3 is a diagram showing the hardware structure of the content generation apparatus 200.

The hard ware structures of the content generation apparatus 200, the home server 300, and the content reproduction apparatus 400 are basically the same as that of the content registration server 100.

The content generation apparatus 200 includes a digital camera, in addition to a basic hardware as a computer. Apparatuses may be connected thereto in a wired manner with a LAN or the like or in a wireless manner with a wireless LAN or the like.

(Operation of System)

Next, a description will be given on operations of the content registration server 100 and the devices on the home network 150 in the system structured as described above. In this embodiment and other embodiments, the operations of the content registration server 100 and the devices are carried out by the CPU and software executed under the control thereof in cooperation with each other.

(Content Registration Process)

Figure 4:
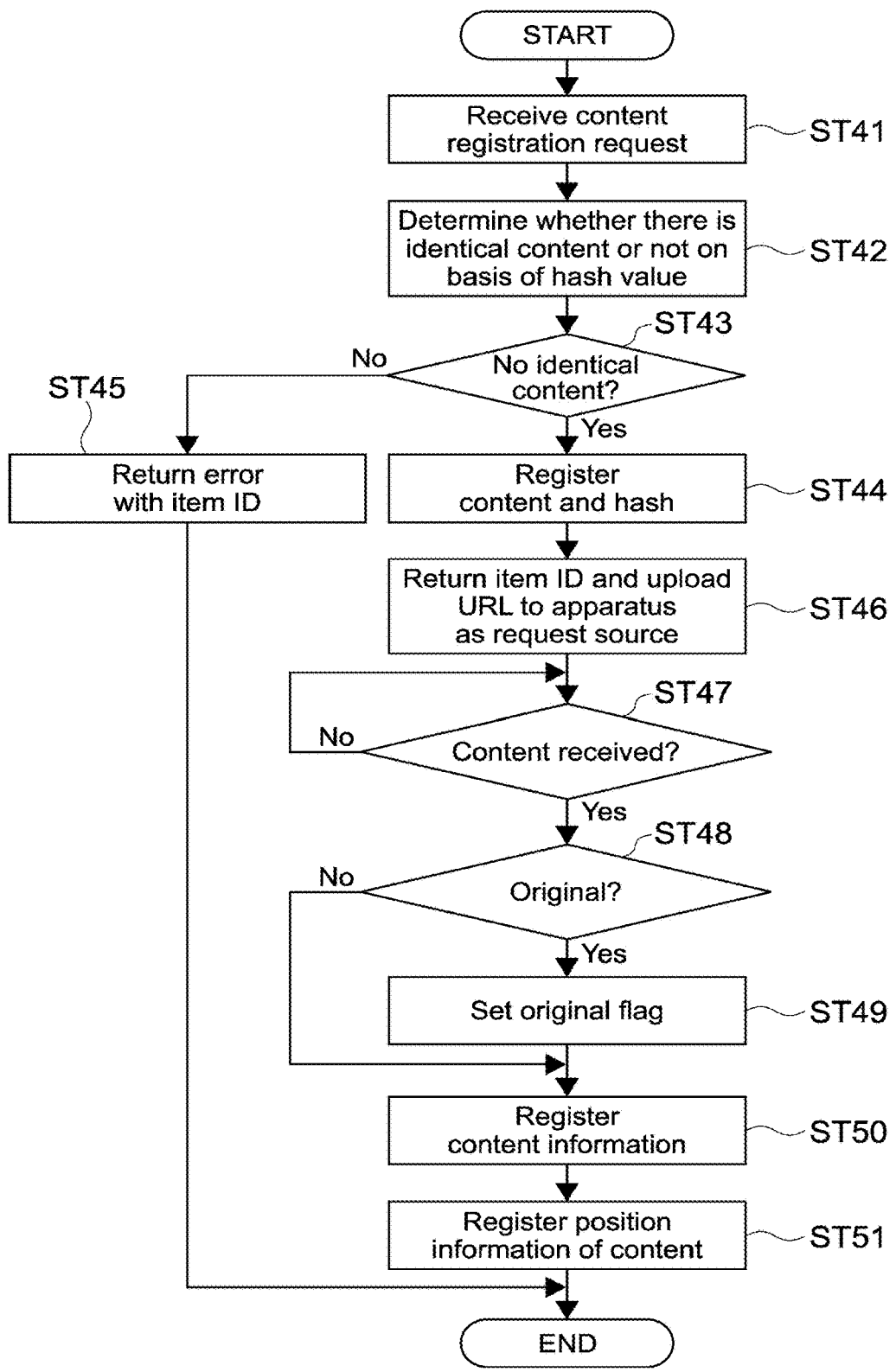
FIG. 4 is a flowchart showing a content registration process in the content registration server.

First, a description will be given on a content registration process with respect to the content registration server 100. FIG. 4 is a flowchart showing a flow of the content registration process in the content registration server 100.

As shown in the figure, the content registration server 100 receives a content registration request that is transmitted from an apparatus on the home network 150 such as the content generation apparatus 200 (Step 41).

The registration request includes the hash value calculated by the content generation apparatus 200 at the time of the generation of the content. In the case where the content generation apparatus 200 does not have a communication function, the content registration request may be transmitted from the home server 300.

Then, on the basis of the hash value, the content registration server 100 determines whether the same content as the content that is a target of the content registration request is already registered or not (Step 42).

In the case where the same content exists (No in Step 43), the content registration server 100 returns an error to the apparatus that is a registration request source, along with the item ID of the content (Step 45).

In the case where the same content does not exist (Yes in Step 43), the content registration server 100 generates the item ID of the content and registers the item ID with the ID associated with the hash value (Step 44).

Subsequently, the content registration server 100 transmits, to the apparatus as the registration request source, the item ID generated and a URL for a content upload (Step 46).

Then, content registration server 100 determines whether the content is uploaded to the URL or not (Step 47).

When it is determined that the content is uploaded (Yes), on the basis of a flag added to the content, the content registration server 100 determines whether the content is original or proxy (Step 48).

In the case where the content is determined to be original (Yes in Step 48), the content registration server 100 sets an original flag with respect to the content (Step 49). The device on the home network 150 can upload both of the original and the proxy of the content but ordinarily uploads the proxy.

Then, the content registration server 100 extracts meta data from the content and registers the meta data with the meta data associated with the item ID and the hash value (Step 50). Specifically, the meta data is data of date and time information when an image is taken, GPS information, a title, rating (favorite) information, a file name, a rotation direction, or the like, for example.

Then, the content registration server 100 registers location information of the original content (Step 51). The location information is transmitted from the apparatus as a request source at a time of the upload. The original content is stored in the home server 300 in many cases, so a pass on the home server 300 is often set for the location information. The location information is used when the content is reproduced.

Through the process as described above, the content registration process is completed.

(Content Reproduction Process)

Figure 5:
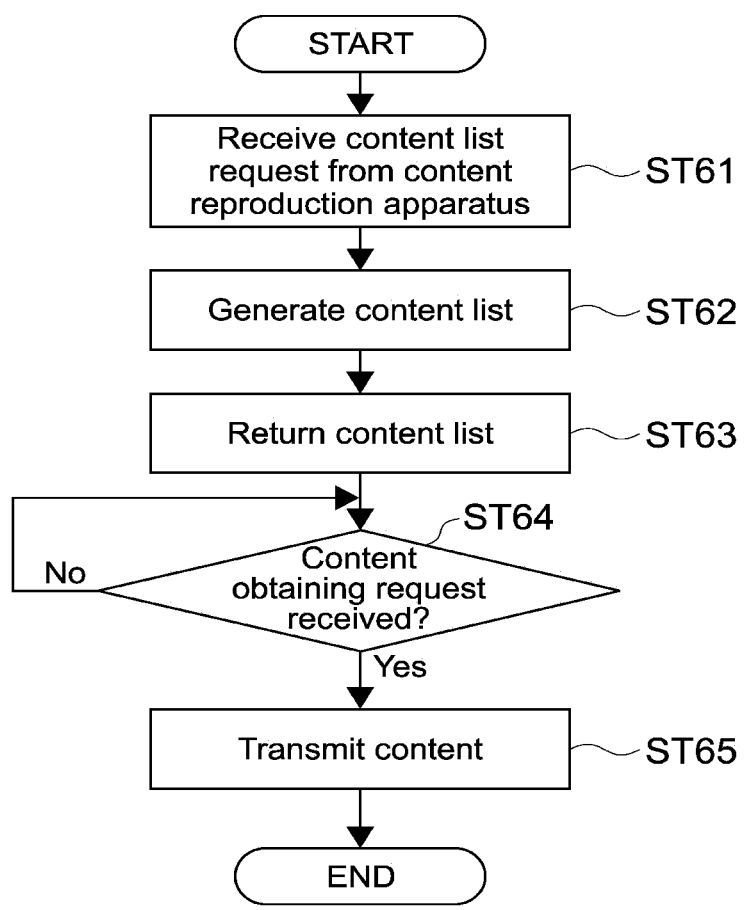
FIG. 5 is a flowchart showing an operation flow of the content registration server at a time of reproduction of a content.

Next, a description will be given on a reproduction process of the content registered. FIG. 5 is a flowchart showing a flow of an operation of the content registration server 100 at a time of reproduction of the content.

As shown in the figure, first, the content registration server 100 receives a content list request from the content reproduction apparatus 400 (Step 61).

In response to the request, the content registration server 100 generates a content list (Step 62) and sends back the list to the content reproduction apparatus 400 (Step 63).

For the reproduction process in the content reproduction apparatus 400, the system of the ULNA is used. Therefore, the content list includes, in addition to information necessary to display the list in the content reproduction apparatus 400, a UUID (Universally Unique Identifier) of the apparatus having the content, information such as an object ID for identifying the content, position information of the content.

Figure 6:
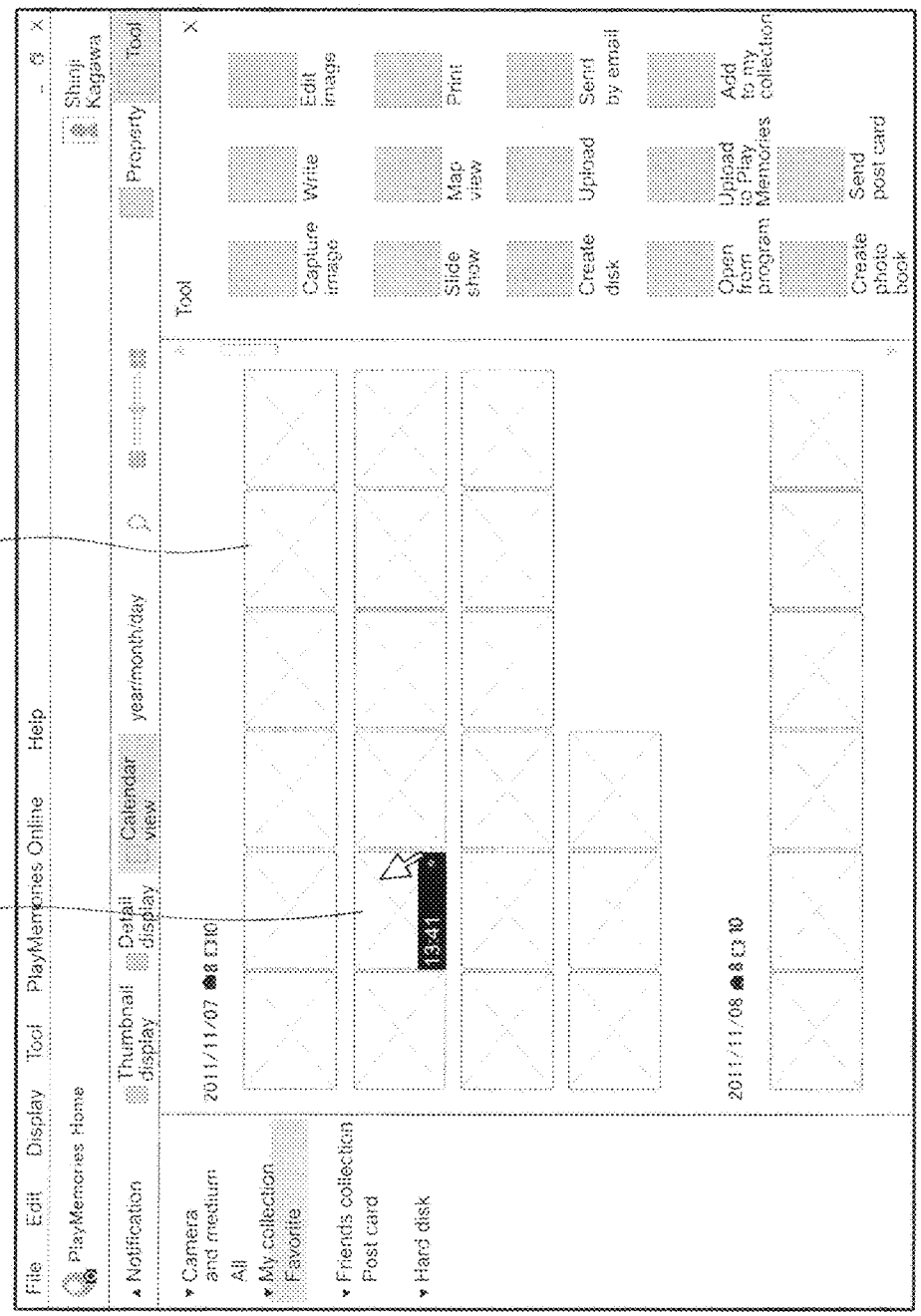
FIG. 6 is a diagram showing an example of a content list generated in the content registration server.
Figure 7:
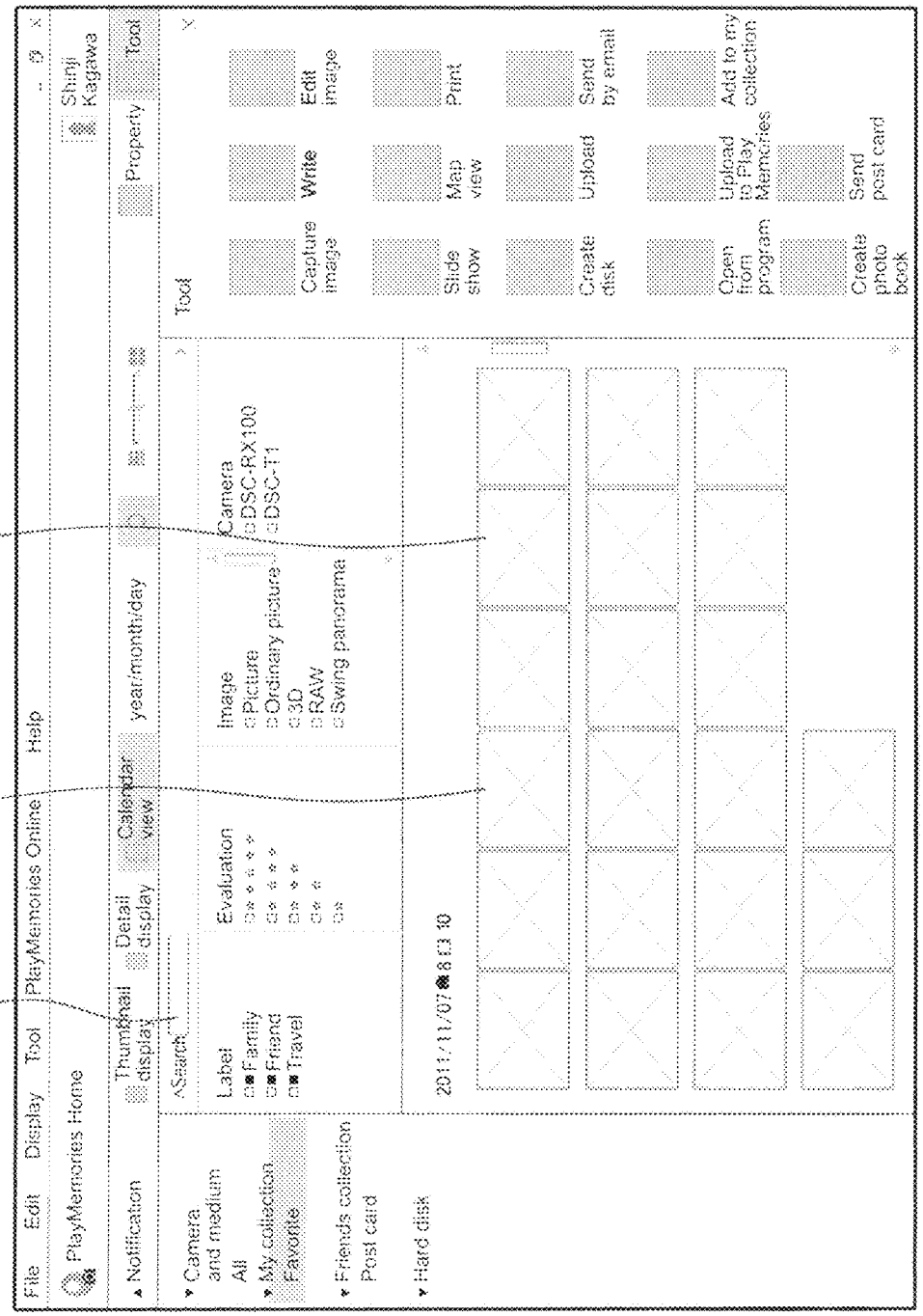
FIG. 7 is a diagram showing an example of a content list generated in the content registration server.
Figure 8:
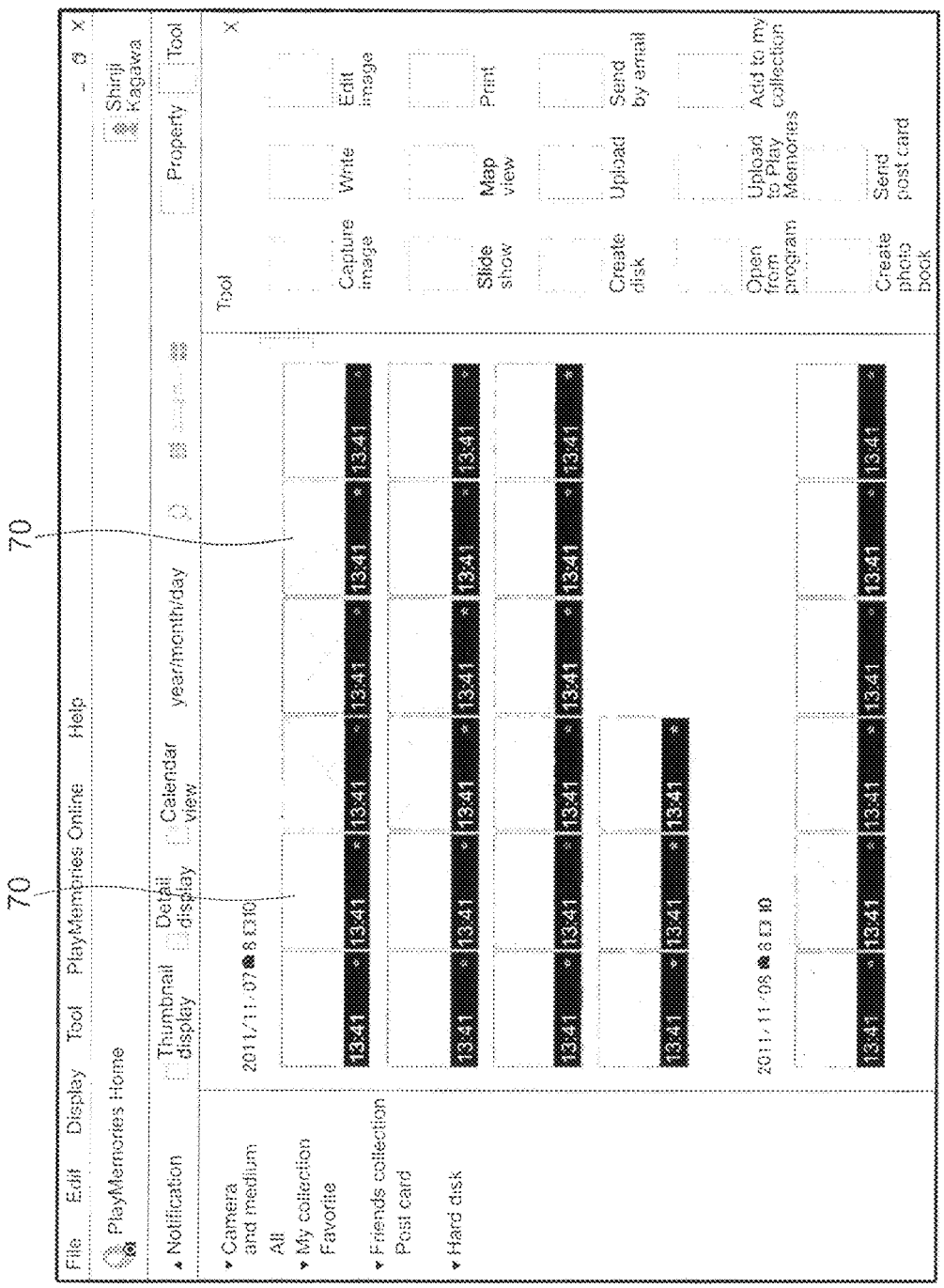
FIG. 8 is a diagram showing an example of a content list generated in the content registration server.

FIGS. 6, 7, and 8 are diagrams each showing an example of the content list. The content list is displayed as a user interface provided by a content reproduction application in the content reproduction apparatus 400, for example.

As shown in those figures, the content list has a display section for a plurality of thumbnails 70 that indicate contents which can be reproduced. The thumbnail 70 is generated from the proxy image 2. The thumbnail 70 is displayed for each date and time when the content (picture or moving image) is generated (taken), for example. The proxy image 2 is registered in the content registration server 100, with the result that the content registration server 100 can quickly generate the content list and can display the list to the content reproduction apparatus 400.

As shown in FIG. 6, when a user hovers the mouse over on a specific thumbnail 70 or places a cursor on the specific thumbnail 70, the information relating to the content corresponding to the thumbnail 70 is displayed under the thumbnail while being overlaid thereon.

FIG. 7 is a diagram showing an example in which a search bar 71 is displayed above the display section of the thumbnails 70. When the user inputs a keyword in the search bar 71 to set a refinement condition box displayed below the bar, it is possible to search a desired content.

FIG. 8 shows a state in which a constant display of the content information shown in FIG. 6 is set to on. As a result, it is possible for the user to confirm the thumbnails and content information of all the content at one view.

In the case where the user selects a content on the content list, the content reproduction apparatus 400 uses the system of the DLNA on the home network 150, thereby obtaining and reproducing a content (original image) having higher image quality. However, for some reasons, there may be a case where a content having higher image quality does not exist on the home network 150. In this case, the content reproduction apparatus 400 obtains the proxy image stored in the content registration server 100 and reproduces the image.

In this case, the content registration server 100 determines whether a content obtaining request is received or not from the content reproduction apparatus 400 (Step 64) and returns the content (proxy image) to the content reproduction apparatus 400 (Step 65). In this case, the content registration server 100 functions as a DMS in the DLNA.

As a result, the content registration server 100 can satisfy the request of the user who wants to reproduce the content at the very least, even if any devices on the home network 150 do not have the content.

(Content Editing Process)

Next, a description will be given on an editing process of the content registered in the content registration server 100.

As the content editing process, editing processes of meta data of the content and the content itself (image) can be given.

Figure 9:
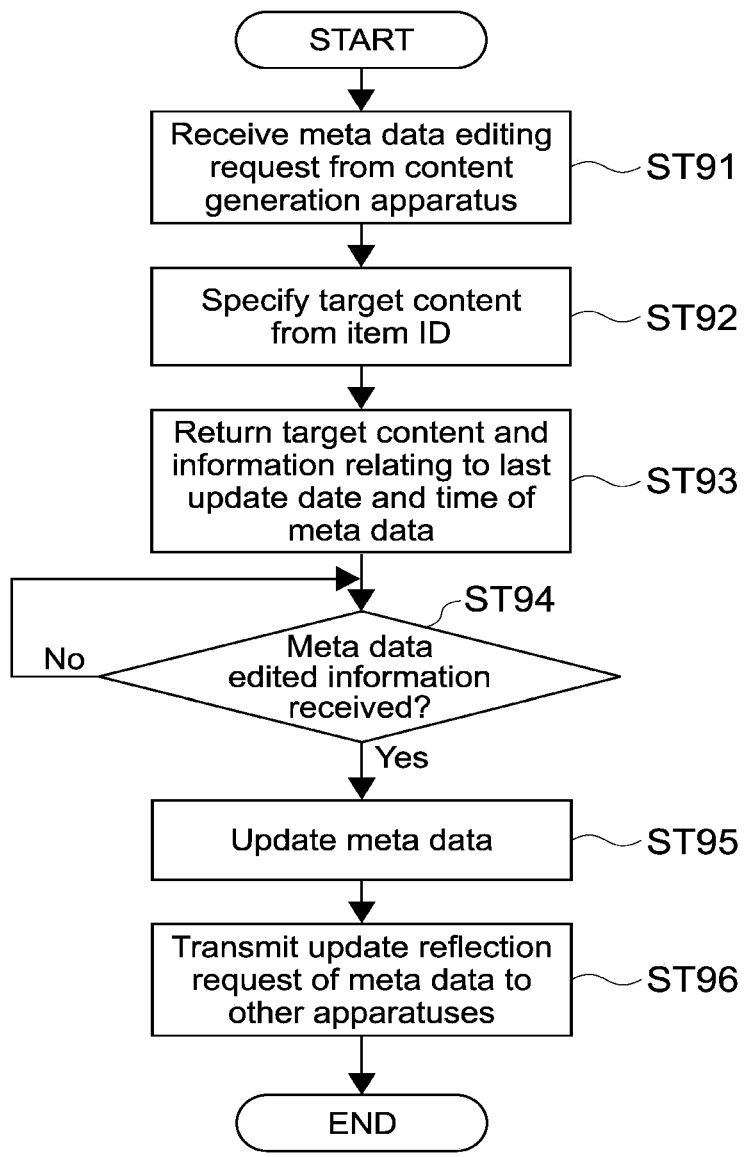
FIG. 9 is a flowchart showing an operation flow of the content registration server in the case where metadata of a content is edited.

First, the editing process of the meta data of the content will be described. FIG. 9 is a flowchart showing an operation flow of the content registration server 100 in the case where the meta data of the content is edited.

As shown in the figure, content registration server 100 receives, from the content generation apparatus 200 such as a smart phone, an editing request for the meta data of the content (Step 91). The request is transmitted with the item ID of the content to be edited added thereto.

Then, in response to the editing request, the content registration server 100 specifies the target content on the basis of the item ID (Step 92).

Then, the content registration server 100 obtains information relating to last update date and time of the target content and the meta data thereof and returns the information to the content generation apparatus 200 (Step 93).

The content generation apparatus 200 that has confirmed the last update date and time information edits the meta data of the content and transmits the edited information to the content registration server 100. Upon reception of the edited information (Yes in Step 94), the content registration server 100 updates (performs overwrite save) the meta data of the content registered by the edited information (Step 95).

Here, as described above, the meta data is data such as the information relating to date and time when the image is taken, the GPS information, the title, rating (favorite) information, and the file name, for example. Further, although details will be described later, in the case where the content is an image file, a rotation direction thereof is also treated as the meta data.

Then, the content registration server 100 transmits an update reflection request for requesting reflection of the update of the meta data by the edited information to the apparatuses on the home network 150 (Step 96). In this case, only information relating to the edited meta data is transmitted, and the content itself is not transmitted. As a result, the apparatuses on the home network 150 can update the meta data of the content without obtaining the update information by themselves each time.

When the meta data is updated, the hash value of the content is not changed, the content is treated as the identical content.

When the editing request is issued from the content generation apparatus 200, if the content registration server 100 already receives the editing request from another content generation apparatus and performs the editing process, the editing request received thereafter is discarded, and the editing process in execution is preferentially performed, thereby reflecting the update to the apparatuses.

Figure 10:
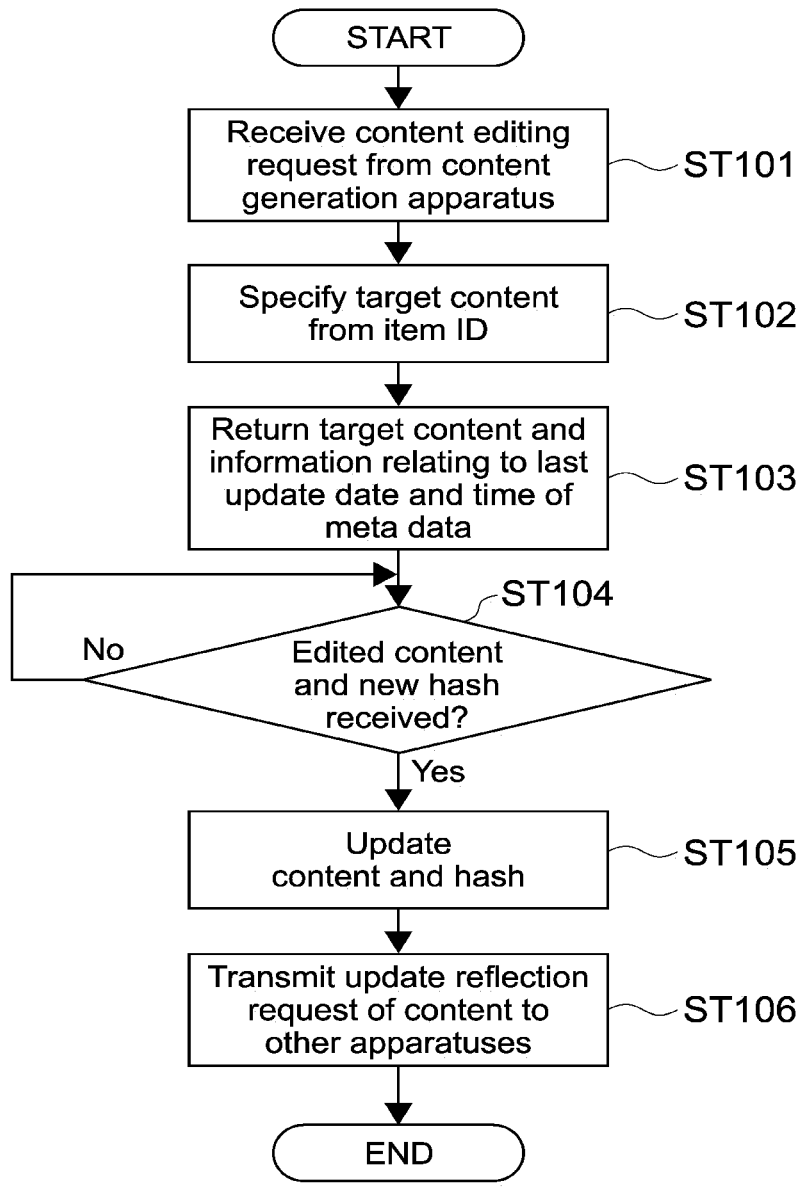
FIG. 10 is a flowchart showing an operation flow of the content registration server in the case where a content itself is edited.

Subsequently, the editing process for the content itself will be described. FIG. 10 is a flowchart showing an operation flow of the content registration server 100 in the case where the content itself is edited.

As shown in the figure, the content registration server 100 receives, from the content generation apparatus 200 such as a smart phone, an editing request for the content (Step 101). The request is transmitted with the item ID of the content to be edited added thereto.

Then, in response to the editing request, the content registration server 100 specifies the target content on the basis of the item ID (Step 102).

Then, the content registration server 100 obtains information relating to last update date and time of the target content and the meta data thereof and returns the information to the content generation apparatus 200 (Step 103).

The content generation apparatus 200 that has confirmed the last update date and time information edits the content and calculates a new hash value from the edited content. Further, the content generation apparatus 200 generates, from the edited content, a low-quality version thereof (proxy image).

Then, the content generation apparatus 200 transmits the proxy image and the new hash value to the content registration server 100.

Here, as the editing of the content, for example, brightness of an image, sharpness, contrast adjustment, color correction, cutout, deformation, noise removal, special effect addition, and the like are conceived.

Upon reception of the edited content (low-quality version) and the hash value (Yes in Step 104), the content registration server 100 updates (performs overwrite save) the registered content (low quality version) by the content and the hash value (Step 105).

Then, the content registration server 100 transmits an update reflection request for requesting the update of the content by the editing to the apparatuses on the home network 150 along with the edited content and the hash value (Step 106). As a result, the apparatuses on the home network 150 can update the content without obtaining the update information by themselves each time.

Of course, the edited original content may be transmitted to the content registration server 100. The edited original content may be transmitted to the apparatuses on the home network 150, and then the update may be reflected thereon.

In this way, in the case where the content itself is edited, the hash value is also changed, the edited content is treated as a different content from the content before the editing.

In the case where the editing process by the content generation apparatus 200 for the meta data or the content is performed at a time of off-line, a time stamp at the time of editing is held. After that, when the content generation apparatus 200 logs in the content registration server 100, in the case where the time stamp is earlier than the last update date and time held by the content registration server 100, the meta data or the content is overwritten to that after the editing.

In this case, because the content registration server 100 does not have an editing history of the content by the content generation apparatus 200, it may be impossible to grasp that a content and meta data of which part are edited last. Therefore, the meta data and the content (and the hash value) which can be edited are entirely overwritten.

Figure 11:
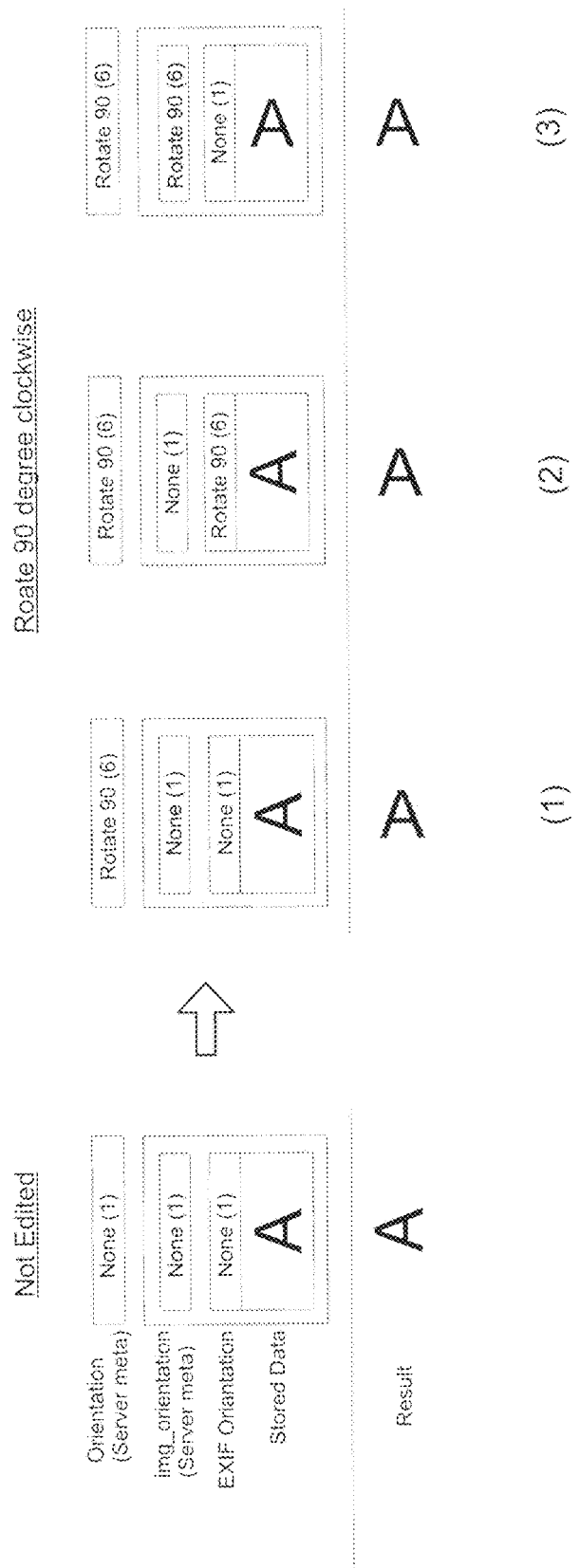
FIG. 11 is a diagram for explaining a rotation editing process of a content.

Next, a rotation editing process for the content will be described. FIG. 11 is a diagram for explaining the rotation editing process for the content.

As the content for which the rotation editing process is performed, a content (for example, Exif, MP4, or the like) that rotation information can be recorded in a file as meta data, a content (JPEG of non-Exif or the like) that rotation information is difficult to be held as meta data, and an image main body part is necessary to be rotated, and a content (for example, MP4 of vertical image-taking) that the both are difficult to be achieved.

In any cases, in order to display the content in a correct rotation state in the content reproduction apparatus 400, the content registration server 100 holds rotation information independent of the rotation information recorded in the file, and the information is treated as a correct rotation direction of the content. Further, the content registration server 100 also holds information (img_orientation) indicating which direction the content is currently directed to from a state at a time of generation.

As shown in the left side of the figure, before the editing of the rotation direction, rotation information (Orientation (server meta)) held by the content registration server 100, and a rotation condition information (img_orientation (server meta)) of the image main body and rotation information (Exif_Orientation) recorded as the meta data in the file are identical.

In the case where the rotation information is edited from the state, the content registration server 100 receives, from the content generation apparatus 200, the rotation editing information (orientation) and img_orientation and Exif_Orientation described above and updates those. Those pieces of information are transmitted to the apparatuses on the home network 150 and reflected thereon.

Then, at the time when the content is displayed, the content reproduction apparatus 400 uses, out of the pieces of information, the rotation editing information (orientation) and img_orientation mentioned above. That is, the content reproduction apparatus 400 regards the rotation editing information (orientation) as a correct direction, applies the rotation editing information (orientation) to an initial state (state that img_orientation is returned to original state) of the content, thereby displaying the content, and ignores Exif_Orientation.

For example, in the case of (1) on the right side in the figure, when the content is rotated by 90 degrees clockwise, the rotation editing information (orientation) on the content registration server 100 is in the state of being rotated by 90 degrees clockwise, and img_orientation is still in the initial state, so a display result is 90 degrees clockwise.

Further, in the case of (2) on the right side in the figure, Exif_Orientation is in the state of being rotated by 90 degrees clockwise, but this is ignored, so the same result as the case of (1) is obtained.

Further, in the case of (3) on the right side in the figure, img_orientation is in the state of being rotated by 90 degrees clockwise. This is returned to the initial state (0 degree), and the rotation editing information (orientation) is applied thereto, with the result that the content is displayed in the state of being rotated by 90 degrees clockwise in the same way as above.

(Content Deletion Process)

Figure 12:
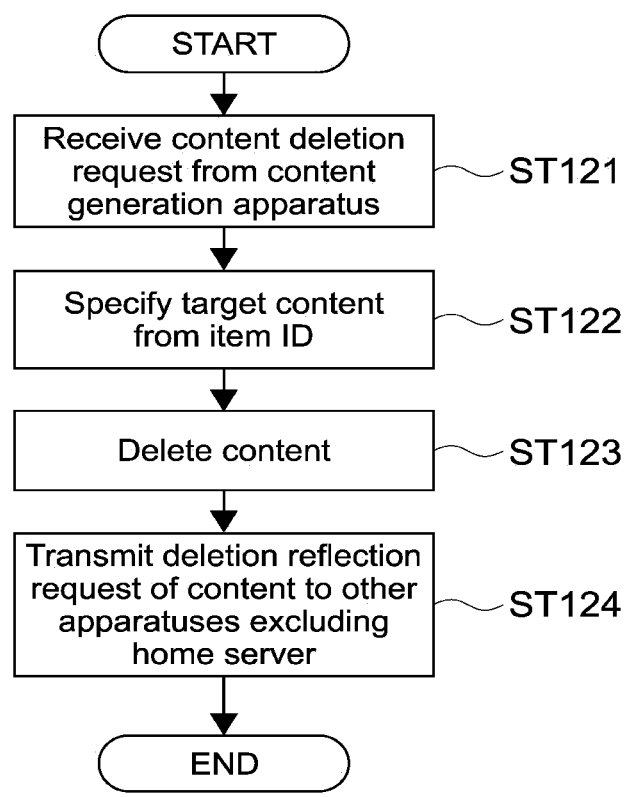
FIG. 12 is a flowchart showing an operation flow of the content registration server in the case where a content registered in the content registration server is deleted.

Next, a description will be given on a deletion process for the content registered in the content registration server 100. FIG. 12 is a flowchart showing an operation flow of the content registration server 100 in the case where the content registered in the content registration server 100 is deleted.

As shown in the figure, first, the content registration server 100 receives, from the content generation apparatus 200, a content deletion request along with the item ID (Step 121).

Then, the content registration server 100 specifies a target content on the basis of the item ID (Step 122) and deletes the content (Step 123). In this case, the content may be the original content or may be the low-quality version thereof.

Then, the content registration server 100 transmits, to the apparatuses on the home network 150 except the home server 300 that stores the original content, a content deletion reflection request (Step 124). At the same time, the content registration server 100 also deletes the registered information relating to the content.

As a result, the deletion of the content is reflected on the apparatuses on the home network 150 except the home server 300, and the content and the content information are deleted.

However, the original content stored in the home server 300 is not deleted, as long as a user performs a deletion process on the home server 300.

Modified Example

The present technology is not limited to the above embodiment and can be variously modified without departing from the gist of the present technology.

In the above embodiment, merely examples are given as the content generation apparatus, the home server, and the content reproduction apparatuses. All the information processing apparatuses can fulfill their functions.

In the above embodiment, the description is given mainly on the case where the content is an image, but the content may be a moving image content, an audio content, or any other contents.

In the above embodiment, as the example of the low-quality version stored in the content registration server 100, the proxy image compressed from the original image is given. However, for example, in the case where the content is moving image data, the low-quality version may be a low bit rate version thereof or a still image of an initial frame.

It should be noted that the present disclosure can take the following configurations.

(1) An information processing apparatus, including:
a communication unit configured to communicate with a plurality of devices;
a storage unit; and
a control unit configured to
control the communication unit to receive a low-quality version of a content from the device, store the received low-quality version in the storage unit with the low-quality version of the content associated with an identifier which is identical with an identifier of the content, thereby registering the content,
generate, in response to a request from the device, a content list including a thumbnail generated from the low-quality version, transmit the content list to the device, and when the content instructed to be reproduced by the device is not stored in any device on the basis of the content list, control the communication unit to transmit the low-quality version to the device.

(2) The information processing apparatus according to Item (1), in which
the control unit
controls the storage unit to store a hash value generated from the content at a time of registration with the hash value associated with the low-quality version,
controls the communication unit to receive a registration request of a new content from the device along with the hash value of the content, and
permits registration of the content when the content having an identical hash value with the received hash value is not stored.

(3) The information processing apparatus according to Item (2), in which
when the content is edited by the device, the control unit controls the communication unit to receive the low-quality version of the edited content and the hash value generated from the edited content, and controls the storage unit to store the edited low-quality version and the hash value received in place of the low-quality version before being edited and the hash value which are stored.

(4) The information processing apparatus according to Item (2) or (3), in which
the control unit controls the storage unit to store meta data of the content, controls, when one of the devices edits the meta data, the communication unit to receive edited information of the meta data, controls the storage unit to update the stored meta data without changing the hash value by the received edited information, and controls the communication unit to transmit the edited information to another device that stores the content.

(5) The information processing apparatus according to Item (4), in which
the content is a still image, and
when the still image registered by the device is rotated, the control unit controls the communication unit to receive information relating to an orientation of the rotated still image as the edited information.

(6) The information processing apparatus according to any one of Items (1) to (5), in which
the control unit controls the storage unit to store storage position information of the content at a time of registration of the content, and in response to a request from the device, controls the communication unit to transmit the storage position information of each content along with the content list.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a storage unit; and
circuitry configured to
communicate with a plurality of devices;
receive a low-quality version of a content from a device that is one of the plurality of devices,
store the received low-quality version in the storage unit with the low-quality version of the content associated with an identifier which is identical with an identifier of the content, thereby registering the content,
generate, in response to a request from the device, a content list identifying a plurality of contents stored on the plurality of devices and including a thumbnail generated from the low-quality version and, when a particular device of the plurality of devices stores a high-quality version of the content, the content list comprises a second identifier identifying the particular device,
transmit the content list to the device,
determine based at least in part on the second identifier whether the content list indicates that any of the plurality of devices stores the content instructed to be reproduced by the device, and
when it is determined that the content list indicates that none of the plurality of devices stores the content instructed to be reproduced by the device, transmit the low-quality version stored in the storage unit to the device.

2. The information processing apparatus according to claim 1, wherein
the circuitry is configured to
control the storage unit to store a hash value generated from the content at a time of registration with the hash value associated with the low-quality version,
receive a registration request of a new content from the device along with the hash value of the content, and
permit registration of the content when the content having an identical hash value with the received hash value is not stored.

3. The information processing apparatus according to claim 2, wherein when the content is edited by the device, the circuitry is configured to receive the low-quality version of the edited content and the hash value generated from the edited content, and to control the storage unit to store the edited low-quality version and the hash value received in place of the low-quality version before being edited and the hash value which are stored.

4. The information processing apparatus according to claim 2, wherein
the circuitry is configured to control the storage unit to store meta data of the content, controls, when one of the devices edits the meta data, the communication unit to receive edited information of the meta data, control the storage unit to update the stored meta data without changing the hash value by the received edited information, and transmit the edited information to another device that stores the content.

5. The information processing apparatus according to claim 4, wherein
the content is a still image, and
when the still image registered by the device is rotated, the circuitry is configured to receive information relating to an orientation of the rotated still image as the edited information.

6. The information processing apparatus according to claim 1, wherein
the circuitry is configured to control the storage unit to store storage position information of the content at a time of registration of the content, and in response to a request from the device, to transmit the storage position information of each content along with the content list.

7. An information processing method, comprising:
receiving a low-quality version of a content from a device that is one of a plurality of devices;
registering the content by storing the received low-quality version with the low-quality version associated with an identifier identical with an identifier of the content;
generating, in response to a request from the device, a content list identifying a plurality of contents stored on the plurality of devices and including a thumbnail generated from the low-quality version and, when a particular device of the plurality of devices stores a high-quality version of the content, the content list comprises a second identifier identifying the particular device;
transmitting the content list to the device;
determining based at least in part on the second identifier whether the content list indicates that any of the plurality of devices stores the content instructed to be reproduced by the device; and
transmitting the low-quality version stored in the storage unit to the device, when it is determined that the content list indicates that none of the plurality of devices stores the content instructed to be reproduced by the device.

8. A non-transitory computer-readable medium storing thereon a program that, when executed on an information processing apparatus, causes the information processing apparatus to execute the steps of
receiving a low-quality version of a content from a device that is one of a plurality of devices,
registering the content by storing the received low-quality version with the low-quality version associated with an identifier identical with an identifier of the content,
generating, in response to a request from the device, a content list identifying a plurality of contents stored on the plurality of devices and including a thumbnail generated from the low-quality version and, when a particular device of the plurality of devices stores a high-quality version of the content, the content list comprises a second identifier identifying the particular device,
transmitting the content list to the device,
determining based at least in part on the second identifier whether the content list indicates that any of the plurality of devices stores the content instructed to be reproduced by the device, and
transmitting the low-quality version stored in the storage unit to the device, when it is determined that the content list indicates that none of the plurality of devices stores the content instructed to be reproduced by the device.

* * * * *